US010057207B2

(12) United States Patent
Kaliski, Jr. et al.

(10) Patent No.: US 10,057,207 B2
(45) Date of Patent: Aug. 21, 2018

(54) SMART NAVIGATION FOR SHORTENED URLS

(71) Applicant: Verisign, Inc., Reston, VA (US)

(72) Inventors: Burton S. Kaliski, Jr., McLean, VA (US); Allison Mankin, Bethesda, MD (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/611,707

(22) Filed: Feb. 2, 2015

(65) Prior Publication Data

US 2015/0156162 A1 Jun. 4, 2015

Related U.S. Application Data

(63) Continuation-in-part of application No. 14/176,723, filed on Feb. 10, 2014.

(60) Provisional application No. 61/809,377, filed on Apr. 7, 2013, provisional application No. 61/811,234, filed on Apr. 12, 2013, provisional application No. 61/820,391, filed on May 7, 2013.

(51) Int. Cl.
*G06F 17/30* (2006.01)
*H04L 29/12* (2006.01)
*G06F 9/46* (2006.01)

(52) U.S. Cl.
CPC .... *H04L 61/1505* (2013.01); *G06F 17/30424* (2013.01); *G06F 17/30876* (2013.01); *G06F 9/465* (2013.01)

(58) Field of Classification Search
CPC ............. H04L 29/12594; H04L 61/301; H04L 29/12009; G06F 17/30038; G06F 17/30997
See application file for complete search history.

(56) References Cited

U.S. PATENT DOCUMENTS

| 6,115,754 A | 9/2000 | Landgren |
| 6,424,980 B1 | 7/2002 | Iizuka et al. |
| 6,625,644 B1 | 9/2003 | Zaras |

(Continued)

FOREIGN PATENT DOCUMENTS

| CN | 1327195 A | 12/2001 |
| CN | 101753559 A | 6/2010 |

(Continued)

OTHER PUBLICATIONS

Demetris Antoniades et al., "we.b: The web of short URLs", Proceedings of the 20th International Conference on World Wide Web. ACM, Mar. 28-Apr. 1, 2011, pp. 715-724.

(Continued)

*Primary Examiner* — Barbara B Anyan
(74) *Attorney, Agent, or Firm* — MH2 Technology Law Group, LLP

(57) ABSTRACT

The present invention generally relates to a system for, and method of, obtaining, from a first identifier in a first name space, a second identifier in a second name space. The disclosed technique involves obtaining the first identifier in the first name space from a source, applying a rule to the first identifier in the first name space, such that a second identifier in a second name space is obtained, and providing the second identifier, such that the source obtains the second identifier without resolving the first identifier using a domain name system (DNS).

14 Claims, 6 Drawing Sheets

(56) References Cited

U.S. PATENT DOCUMENTS

| | | | |
|---|---|---|---|
| 6,654,741 B1 | 11/2003 | Cohen et al. | |
| 6,901,436 B1* | 5/2005 | Schneider | H04L 29/12009 707/999.01 |
| 6,957,224 B1 | 10/2005 | Megiddo et al. | |
| 7,130,877 B2 | 10/2006 | McNeely et al. | |
| 7,315,902 B2 | 1/2008 | Kirkland | |
| 7,634,532 B2 | 12/2009 | Kawamura et al. | |
| 7,894,986 B2 | 2/2011 | Hegedus et al. | |
| 7,908,317 B2 | 3/2011 | Musson | |
| 7,921,097 B1 | 4/2011 | Dandekar et al. | |
| 8,001,013 B2* | 8/2011 | Serbanescu | G06Q 30/0601 705/26.4 |
| 8,060,601 B1 | 11/2011 | Brown et al. | |
| 8,073,850 B1 | 12/2011 | Hubbard et al. | |
| 8,082,491 B1* | 12/2011 | Abdelaziz | G06F 9/465 709/201 |
| 8,224,994 B1* | 7/2012 | Schneider | G06Q 30/02 709/217 |
| 8,381,276 B2 | 2/2013 | Costinsky | |
| 8,463,877 B1 | 6/2013 | Richardson et al. | |
| 8,510,348 B2 | 8/2013 | Hancock | |
| 8,630,200 B2 | 1/2014 | St. Jean et al. | |
| 8,756,341 B1* | 6/2014 | Richardson | H04L 67/2814 370/351 |
| 2002/0010709 A1* | 1/2002 | Culbert | G06F 17/30876 715/234 |
| 2002/0046257 A1 | 4/2002 | Killmer | |
| 2002/0193986 A1* | 12/2002 | Schirris | G06F 17/2872 704/8 |
| 2003/0208472 A1* | 11/2003 | Pham | G06F 17/30876 |
| 2004/0039798 A1 | 2/2004 | Hotz et al. | |
| 2005/0060291 A1 | 3/2005 | Kirkland et al. | |
| 2005/0071834 A1 | 3/2005 | Gates et al. | |
| 2006/0101005 A1* | 5/2006 | Yang | G06F 17/3087 |
| 2007/0094727 A1 | 4/2007 | Singh | |
| 2007/0100795 A1 | 5/2007 | Davies | |
| 2007/0130109 A1 | 6/2007 | King et al. | |
| 2007/0150342 A1 | 6/2007 | Law et al. | |
| 2007/0180147 A1 | 8/2007 | Leigh | |
| 2007/0250468 A1 | 10/2007 | Pieper | |
| 2007/0255731 A1* | 11/2007 | Maze | G06F 17/30011 |
| 2007/0273518 A1 | 11/2007 | Lupoli et al. | |
| 2008/0005194 A1* | 1/2008 | Smolen | G06F 17/30348 |
| 2008/0086555 A1 | 4/2008 | Feinleib | |
| 2008/0201413 A1* | 8/2008 | Sullivan | H04L 29/12066 709/203 |
| 2008/0228719 A1 | 9/2008 | Abhyanker et al. | |
| 2008/0228720 A1* | 9/2008 | Mukherjee | G06F 17/30672 |
| 2008/0281816 A1 | 11/2008 | Kim | |
| 2008/0306913 A1 | 12/2008 | Newman et al. | |
| 2009/0228557 A1 | 9/2009 | Ganz et al. | |
| 2009/0254425 A1 | 10/2009 | Horowitz et al. | |
| 2009/0254427 A1 | 10/2009 | Garrison | |
| 2010/0031369 A1 | 2/2010 | Grummt | |
| 2010/0036797 A1 | 2/2010 | Wong et al. | |
| 2010/0077323 A1 | 3/2010 | Hunter | |
| 2010/0097634 A1 | 4/2010 | Meyers et al. | |
| 2010/0198837 A1 | 8/2010 | Wu et al. | |
| 2010/0287191 A1 | 11/2010 | Price et al. | |
| 2010/0325101 A1 | 12/2010 | Beal et al. | |
| 2011/0055314 A1 | 3/2011 | Rosenstein et al. | |
| 2011/0078553 A1 | 3/2011 | Reimann et al. | |
| 2011/0113112 A1 | 5/2011 | Ganz et al. | |
| 2011/0119243 A1* | 5/2011 | Diamond | G06F 17/30867 707/706 |
| 2011/0137789 A1 | 6/2011 | Kortina et al. | |
| 2011/0179154 A1 | 7/2011 | Ravichandran et al. | |
| 2011/0238584 A1 | 9/2011 | Ikavalko et al. | |
| 2011/0258204 A1 | 10/2011 | Hubbard et al. | |
| 2011/0307432 A1* | 12/2011 | Yao | G06F 17/30864 706/25 |
| 2012/0079368 A1* | 3/2012 | Abdelaziz | G06F 9/465 715/234 |
| 2012/0173565 A1 | 6/2012 | Jacobs et al. | |
| 2012/0173692 A1 | 7/2012 | Lakes et al. | |
| 2012/0204224 A1 | 8/2012 | Wang et al. | |
| 2012/0239731 A1 | 9/2012 | Shyamsunder et al. | |
| 2012/0278467 A1* | 11/2012 | Schneider | G06Q 30/02 709/223 |
| 2012/0323912 A1* | 12/2012 | Stephens, Jr. | G06F 17/30525 707/736 |
| 2013/0018944 A1 | 1/2013 | Shyumsunder et al. | |
| 2013/0067115 A1 | 3/2013 | Lapanc | |
| 2014/0040312 A1 | 2/2014 | Gorman et al. | |
| 2014/0136572 A1 | 5/2014 | Miller et al. | |
| 2014/0143337 A1 | 5/2014 | McIntosh et al. | |
| 2014/0156702 A1 | 6/2014 | Shyamsunder et al. | |
| 2014/0181256 A1 | 6/2014 | Trifa et al. | |
| 2014/0245193 A1 | 8/2014 | Brindley | |
| 2015/0296230 A1* | 10/2015 | Barton | G06F 1/3203 725/32 |

FOREIGN PATENT DOCUMENTS

| | | |
|---|---|---|
| CN | 101840413 A | 9/2010 |
| CN | 102246171 A | 11/2011 |
| JP | H11-328079 A | 11/1999 |
| WO | 98/03923 A1 | 1/1998 |
| WO | 2005/001628 A2 | 1/2005 |
| WO | 2005/031613 A1 | 4/2005 |
| WO | 2010/002603 A1 | 1/2010 |
| WO | 2010/068376 A2 | 6/2010 |
| WO | 2012/151752 A1 | 11/2012 |

OTHER PUBLICATIONS

International Search Report and Written Opinion of the International Searching Authority dated Nov. 30, 2015, International Application No. PCT/US2015/046705, pp. 1-9.
Extended European Search Report dated Dec. 22, 2015, European Application No. 15182432.3, pp. 1-6.
Non-Final Office Action dated Sep. 14, 2015, U.S. Appl. No. 14/176,723, pp. 1-17.
Anonymous, "Semantic URL—Wikipedia, the free encyclopedia", Jan. 29, 2015, Retrieved from the internet on Jun. 2, 2016: http://web.archive.org/web/20150129082609/http://en.wikipedia.org/wiki/Semantic_URL, pp. 1-3.
Anonymous, "URL redirection—Wikipedia, the free encyclopedia", Jan. 17, 2015, Retrieved from the internet on Jun. 2, 2016: http://web.archive.org/web/20150117115508/http://en.wikipedia.org/wiki/URL_redirection, pp. 1-10.
Extended European Search Report dated Jun. 23, 2016, European Application No. 16153508.0, pp. 1-12.
Final Office Action dated May 5, 2016, U.S. Appl. No. 141176,723, pp. 1-30.
First Chinese Office Action dated Apr. 1, 2016, Chinese Application No. 201280014226.6, pp. 1-32.
Extended European Search Report dated Aug. 5, 2016, European Application No. 14783257.0, pp. 1-8.
Final Office Action dated Aug. 12, 2015, U.S. Appl. No. 13/622,541, pp. 1-28.
Non-Final Office Action dated Feb. 13, 2015, U.S. Appl. No. 13/250,864, filed Sep. 30, 2011, pp. 1-17.
Non-Final Office Action dated Jan. 23, 2015, U.S. Appl. No. 13/622,541, filed Sep. 19, 2012, pp. 1-26.
Non-Final Office Action dated Jun. 2, 2014, U.S. Appl. No. 13/622,541, filed Sep. 19, 2012, pp. 1-36.
Non-Final Office Action dated Jun. 6, 2014, U.S. Appl. No. 14/176,723, filed Feb. 10, 2014, pp. 1-21.
Extended European Search Report dated Feb. 12, 2014 issued in European Application No. 13182268.6 filed Aug. 29, 2013, 5 pages.
T.V. Raman, "Usage Patterns for Client-Side URI Parameters," W3C Working Draft, Apr. 15, 2009, pp. 1-7, http://www.w3.org/TR/2009/WD-hash-in-uri-20090415, accessed Jun. 12, 2012.
International Search Report and Written Opinion dated Jun. 21, 2012, International Application No. PCT/US2012/028848, filed Mar. 13, 2012, 12 pages.

(56) References Cited

OTHER PUBLICATIONS

Non-Final Office Action dated Oct. 22, 2013, U.S. Appl. No. 13/250,864, filed Sep. 30, 2011, pp. 1-15.
Non-Final Office Action dated Apr. 20, 2017, U.S. Appl. No. 14/834,198, pp. 1-46.
Non-Final Office Action dated Jul. 12, 2017, U.S. Appl. No. 14/176,723, pp. 1-31.
Second Office Action dated Jan. 16, 2017, Chinese Patent Application No. 201280014226.6, pp. 1-7.
Final Office Action dated Feb. 24, 2017, U.S. Appl. No. 14/176,723, pp. 1-17.
First Office Action dated Sep. 19, 2017, Chinese Application No. 201310388767.1, pp. 1-11 (including English Translation).
Mike Thelwall et al., "Custom Interfaces for Advanced Queries in Search Engines", 2001, ASLIB Proceedings, 53 (10), pp. 413-422.
XDI Organization, History—xdi.org, Retrieved from the Internet Sep. 6, 2017: http://xdi.org/?page_id=13, pp. 1-3.
Bill H. Washburn, "OASIS Extensible Resource Identifier (XRI) TC", Retrieved from the Internet Sep. 6, 2017: https://www.oasis-open.org/committees/xri/ipr.php, pp. 1-3.
United States Court of Appeals, Federal Circuit, *Cordance Corporation* v. *Amazon Com Inc*, Retrieved from the Internet on Sep. 6, 2017: http://caselaw.findlaw.com/us-federal-circuit/1581016.html, pp. 1-7.
Mark Little, "XRI versus URI?", May 22, 2005, Retrieved from the Internet Sep. 6, 2017: https://www.infoq.com/news/2008/05/xsiurl, pp. 1-8.
PTO Final Office Action dated Jan. 26, 2018, U.S. Appl. No. 14/176,723, pp. 1-25.
PTO Non-Final Office Action dated Feb. 5, 2018, U.S. Appl. No. 15/697,171, pp. 1-33.

\* cited by examiner

SMART NAVIGATION FOR SHORTENED URLS

RELATED APPLICATION

This application is a continuation-in-part of, and claims the benefit of, pending U.S. Utility patent application Ser. No. 14/176,723 filed Feb. 10, 2014 and entitled, "Smart Navigation Services", which claims the benefit of U.S. Provisional Patent Application No. 61/809,377 filed Apr. 7, 2013 and entitled, "Desired Resource Navigation", U.S. Provisional Patent Application No. 61/811,234 filed Apr. 12, 2013 and entitled, "Desired Resource Navigation", and U.S. Patent Application No. 61/820,391 filed May 7, 2013, and entitled, "Smart Navigation in General Name Spaces", the disclosures of which are hereby incorporated by reference herein in their entireties.

FIELD OF THE INVENTION

This invention relates generally to network navigation.

BACKGROUND OF THE INVENTION

Navigation services provide a general framework for navigating to information on the internet. In the framework, resources of interest, such as web pages, are identified, in general, by a name and a keyword. The user or entity with whom the name is associated, or "name owner" for short, specifies the mapping from name+keyword combinations to resources, for instance by the uniform resource locator (URL) for the resource. The mappings are maintained by the navigation service in a directory that an application such as a browser can access both to look up the resource corresponding to a given name+keyword combination, and to obtain suggestions of name+keyword combinations that may be of interest.

Such navigation services provide an attractive alternative to Internet search, which is easy to use but not precise for discovering a specific, named resource. They also improve on standard URL navigation via the browser address bar, which, in contrast, is precise, but not necessarily easy to use because of the long and sometimes cryptic nature of the URLs employed in practice.

SUMMARY

According to some embodiments, a method for obtaining, from a first identifier in a first name space, a second identifier in a second name space, is disclosed. The method includes obtaining the first identifier in the first name space from a source; applying a rule to the first identifier in the first name space, such that a second identifier in a second name space is obtained; and providing the second identifier; such that the second identifier is obtained without resolving the first identifier using a domain name system (DNS).

Various optional features of the above embodiments include the following. The first name space may be a name space of uniform resource locators (URL) and the first identifier may be a URL. The second name space may be a name space of uniform resource locators (URL) and the second identifier may be a URL. The first identifier may include a name, and the method may further include obtaining a representation of the rule from an owner of the name. The representation of the rule may include a cryptographic digital signature of the name owner. The first name space may be a name space of uniform resource locators (URL), the first identifier may be a URL, and the method may further include responding to the name owner with the second identifier comprising a URL comprising no more than 21 characters. The rule may include a description of a syntactic manipulation of an identifier. The obtaining, the applying, and the providing may be performed by a browser. The method may include providing a copy of the rule to the browser. The browser may obtain a copy of the rule from an information centric network.

According to some embodiments, a computer system for obtaining, from a first identifier in a first name space, a second identifier in a second name space, is disclosed. The system includes at least one electronic processor in operative communication with at least one electronic memory storing computer-readable instructions which, when executed by the at least one electronic processor, cause the at least one electronic processor to: obtain the first identifier in the first name space from a source; apply a rule to the first identifier in the first name space, such that a second identifier in a second name space is obtained; and provide the second identifier; such that the second identifier is obtained without resolving the first identifier using a domain name system (DNS).

Various optional features of the above embodiments include the following. The first name space may be a name space of uniform resource locators (URL) and the first identifier may be a URL. The second name space may be a name space of uniform resource locators (URL) and the second identifier may be a URL. The first identifier may include a name, and the at least one electronic memory may further store computer-readable instructions which, when executed by the at least one electronic processor, further cause the at least one electronic processor to: obtain a representation of the rule from an owner of the name. The representation of the rule may include a cryptographic digital signature of the name owner. The first name space may be a name space of uniform resource locators (URL) and the first identifier may be a URL, where the at least one electronic memory further stores computer-readable instructions which, when executed by the at least one electronic processor, further cause the at least one electronic processor to: respond to the name owner with the second identifier comprising a URL comprising no more than 21 characters. The rule may include a description of a syntactic manipulation of an identifier. The computer system may include computer-readable instructions representing a browser, and the computer-readable instructions representing the browser may include the computer readable instructions which, when executed by the at least one electronic processor, cause the at least one electronic processor to: apply the rule to the first identifier in the first name space, such that the second identifier in a second name space is obtained. The at least one electronic memory may further store computer-readable instructions which, when executed by the at least one electronic processor, further cause the at least one electronic processor to: provide a copy of the rule to the browser. The browser may be further configured to obtain a copy of the rule from an information centric network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
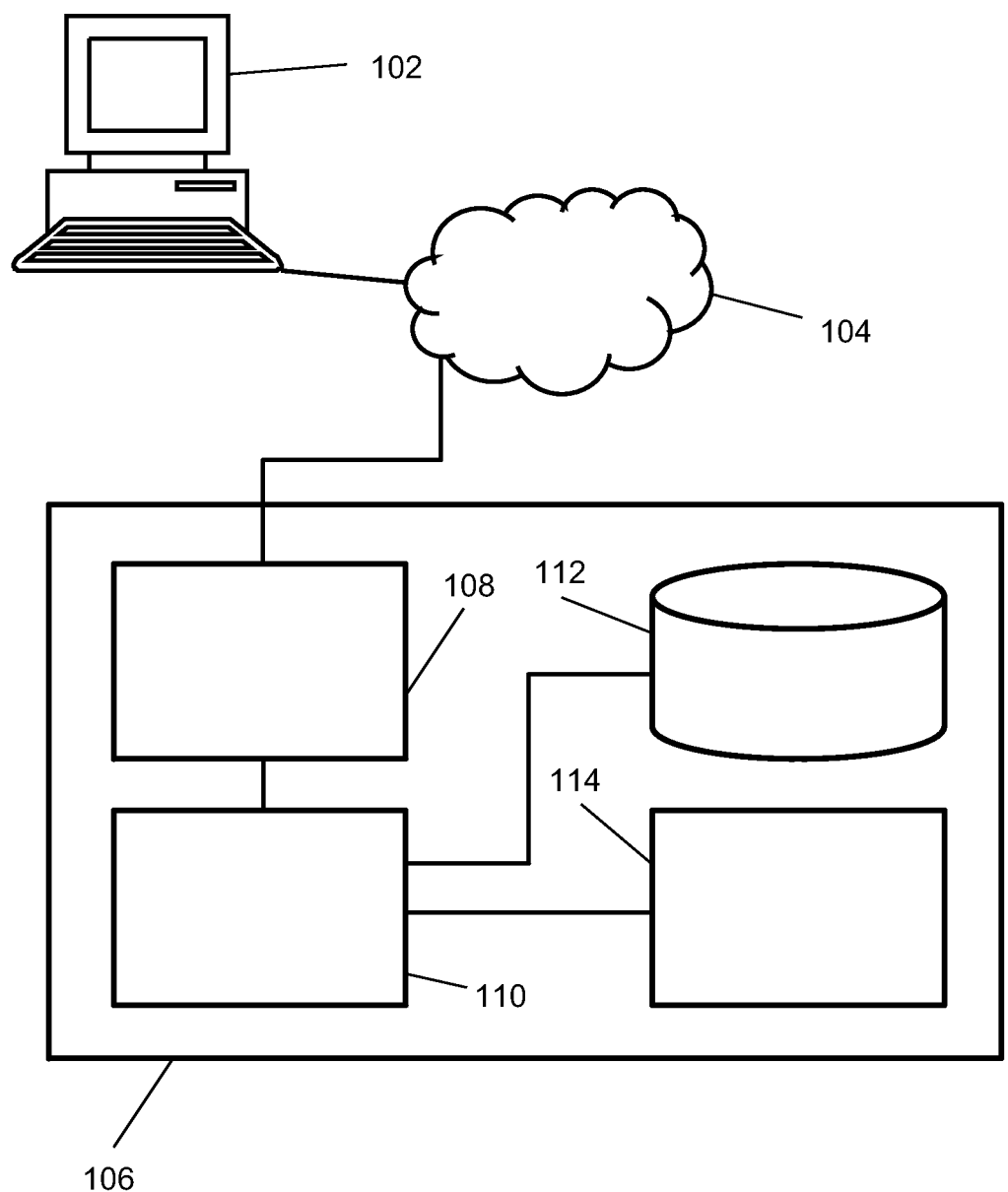
FIG. 1 is a schematic diagram of a navigation service system according to some embodiments.

FIG. 1 is a schematic diagram of a navigation service system 106 according to some embodiments. Navigation service system 106 may be suitable for implementing, at least in part, some embodiments disclosed herein. Client computer 102 may be connected to navigation service 106 through the internet 104. According to some embodiments, client computer 102 may be a laptop, desktop, tablet, smart phone, or other type of device or computer. Client computer 102 may be capable of executing an internet browser, known in the art. Some embodiments may be implemented at least partially by, or with, such a browser executing on client computer 102.

Navigation service 106 includes network interface 108, capable of communicating with a plurality of client computers over the internet. Network interface 106 may include a physical collection of server computers. Network interface 106 may be communicatively coupled to processors 110. Processors 110 are configured to process identifiers as disclosed herein. In particular, processors are communicatively coupled to persistent storage 112 and to rules engine 114. Persistent storage may store rules and/or identifier data as disclosed herein. Such identifier data may include identifiers stored in association with (e.g., in a same database row as) associated identifiers from various name spaces. Rules engine 114 may include a plurality of electronic processors configured to execute rules as disclosed herein.

In some embodiments, the navigation service includes a computer-readable directory that includes triples of associated data, e.g., an entity name, from a name space, stored in association with a keyword and a destination URL. Such a triple may be schematically represented as (<name>, <keyword>, <URL>). This permits mappings from a name and keyword combination to a URL. The triples may form a portion of a row in a database that has a column for entity names, a column for keywords, and a column for corresponding URLs. Names may be in any of a variety of name spaces. Examples include the TWITTER™ name space, with names of the form of a string beginning with the "@" character, such as "@example_brand". A browser may be configured with a navigation service URL or IP address, and a user may type an entity name and keyword combination into the navigation field of the browser. An example is "@macys!shoes". The browser may connect with the navigation service via the configured URL or IP address to obtain a URL corresponding to the entity name and keyword combination, and the navigation service may return the corresponding URL to the browser to be resolved via ordinary URL processing.

Other example name spaces include the FACEBOOK™ name space and the LINKEDIN™ name space. Regarding these resources, in general, a user can navigate to an example user's page by entering a URL of the form, respectively, http://www.facebook.com/example_user_name or http://www.linkedin.com/example_user_name. The form of these URLs provides name spaces consisting of all names of the form example_user_name for which an account exists in the respective resource. Another name space is the space of email addresses, with names of the form "user@example.com", where "user@example.com" is an email address.

Yet another example of a name space is the name space defined by shortened URLs. Shortened URLs have been adopted as abbreviated versions of potentially long and complex URLs. Shortened URLs may have no more than 25 characters, 24 characters, 23 characters, 22 characters, 21 characters, or 20 characters, by way of non-limiting examples. They typically have the form "name/code" where "name" is a short domain name and "code" is a short string identifying a particular reference to the full URL. An entry of the form "bitly:name/code!keyword" may be processed by a navigation service according to embodiments disclosed herein as a way to lookup additional information about a shortened URL or the resource it refers to. (A shortened URL also typically includes a scheme identifier such as "http:" or "https:" which is omitted here for simplicity.)

Figure 2:
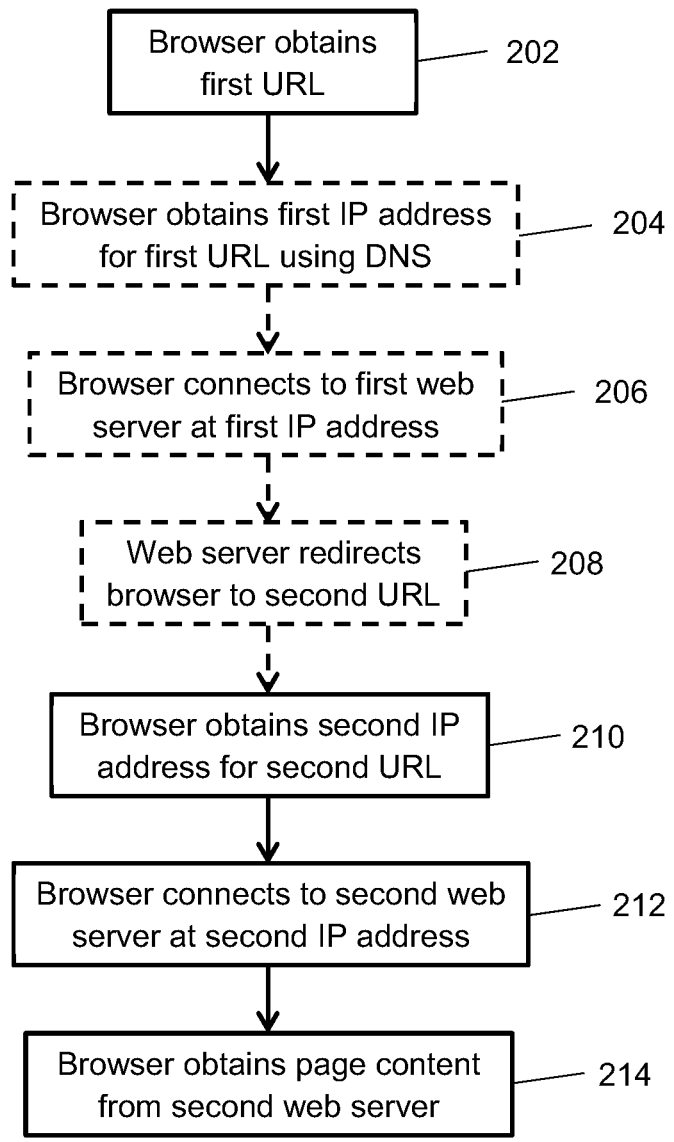
FIG. 2. is a flow chart of a prior art method for browsing to a shortened URL.

Shortened URLs are typically provided by a URL shortening service. Such a service typically presents a public portal, such as a webpage, to users. The portal web page itself typically has a short URL, e.g., bit.ly. A URL shortening service web page may include a field into which a user may enter an arbitrary URL, e.g., http://blogs.verisigninc.com/blog/entry/verisign_s_preliminary_comments_on.
Upon receiving an arbitrary URL, the web shortening service may return a short URL to the user, e.g., http://bitly/1BQOgWL. The web page may return such a short URL by presenting it in a field from which a user may copy it. Typically, URL shortening services provide short URLs that include less than a certain number of characters. The number of characters may be, e.g., any number less than 25. FIG. 2, described immediately below, shows how a user's browser may navigate to a short URL such that the browser ultimately navigates to the corresponding long URL.

According to some embodiments disclosed herein, a navigation service directory may be augmented by including rules. The rules may be stored as, by way of non-limiting example, quadruples of the form (<name>, <keyword>, <URL>, <rule>). Other storage arrangements are described herein. Such rules and the usage thereof is described in detail herein.

There are many variations possible with the embodiments disclosed herein. For example, the navigation service is not limited to handling only entity name and keyword combinations. Rather, a navigation service can handle just an entity name, a combination or two or more entity names (e.g., forming a hierarchy), or a combination of two or more keywords (assuming appropriate ownership of at least one of the keywords), or some other combination.

FIG. 2. is a flow chart of a prior art method for browsing to a shortened URL. The method of FIG. 2 may be implemented in part by a browser executing on a client computer. A shortened URL is, by definition, a URL. In a typical form, it includes of a domain name (e.g., "vrsn.cc") and a path name (e.g., "1j1XaIR"). The scheme identifier is "http:", so an example shortened URL may be http://vrsn.cc/1j1XaIR. Used as intended, a shortened URL redirects a browser to another URL. For the example shortened URL http://vrsn.cc/1j1XaIR, the redirection is to the URL for a blog post by Verisign, namely, http://blogs.verisigninc.com/blog/entry/verisign_s_preliminary_comments_on. FIG. 2 depicts steps that occur for such a redirection to be accomplished.

Figure 3:
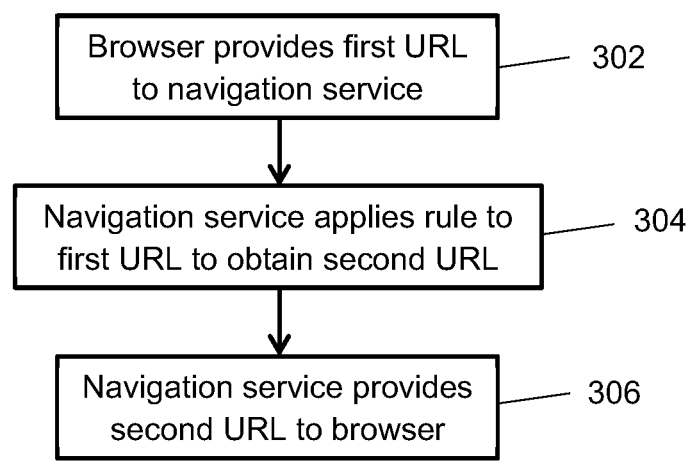
FIG. 3 is a flow chart of a method for using a shortened URL according to some embodiments.

Note that blocks 204, 206 and 208 of FIG. 2 are depicted using dotted lines to illustrate that they are replaced by other steps (e.g., as depicted in FIG. 3) according to some embodiments.

At block 202, the method may begin when a user or other entity directs a browser to a shortened URL. This may be accomplished by a user clicking on a link or entering the link into a navigation field of a browser, for example.

At block 204, the browser looks up the internet protocol (IP) address corresponding to the domain name specified in the shortened URL using the Domain Name System (DNS). With a typical two-level domain name, this may involve substeps as follows. Initially, the browser may send the domain name to a recursive name server. If the recursive name server has the corresponding IP address in its cache, it returns it to the browser; otherwise, the recursive name server contacts one of the DNS root servers to obtain the IP address of the name server for the top-level domain (TLD), e.g., ".cc". The recursive name server then contacts the name server for the TLD to obtain the IP address of the name server for the second-level domain (SLD) (e.g., "vrsn.cc"). Next, the recursive name server contacts the name server for the SLD to obtain the IP address of the web server of interest, and returns it to the browser.

At block 206, the browser connects to the web server at the IP address obtained from DNS over the HTTP protocol. The browser requests the page specified in the shortened URL (e.g., "1j1XaIR").

At block 208, the web server redirects the browser to the corresponding full URL, for example, http://blogs.verisigninc.com/blog/entry/verisign_s_preliminary_comments_on.

At block 210, the browser uses DNS to look up the IP address corresponding to the domain name in the full URL, e.g., blogs.verisigninc.com. This involves contacting DNS name servers in a manner as described above in reference to block 204.

At block 212, the browser connects to the web server at this IP address over the HTTP protocol and requests the page specified in the full URL, e.g., "blog/entry/verisign_s_preliminary_comments_on.

At block 214, the browser obtains the page content from the contacted web server. The browser may then display or otherwise act on the displayed content.

One of the recognized problems with the process illustrated in FIG. 2 is that redirection may take a toll on performance. In addition to blocks 210, 212 and 214, which are part of accessing the web page itself, blocks 204, 206 and 208 are also included just to get started, reflecting essentially a doubling of effort.

Another problem with the process illustrated in FIG. 2 is potential instability. The target content of interest may be located at an established web site whose domain name is selected, at least in part, because of the presumed stability of the TLD, or its positive association with the business objectives of the web site. Similarly, the name server for the SLD, being associated with the established web site, may also provide a level of service comparable to that of the web site. Blocks 210, 212 and 214 may therefore have high stability. The root server, the TLD name server, and the SLD in block 210 can be expected to be available both in real time to respond to a request, and over the long term to ensure that the domain name can continue to be resolved. Likewise, the web server in steps 210 and 212 can be expected to be responsive to requests now and in the future. In contrast, domain names in shortened URLs may be selected based not on the stability of the associated TLD, but on the shortness and/or mnemonic characteristics of the TLD. In addition, the stability of the name server for the SLD in the shortened domain name may not be directly correlated with the value of the content of interest, but rather with the viability of the shortening service. As a result, blocks 204, 206 and 208 may have a stability level that is uncorrelated with the business objectives of the web site. This implies that the stability of these components may depend not on the content of interest, but on external factors. Moreover, the unavailability of the TLD and SLD name servers and the URL shortening service due to error or attack can result in the temporary inability to resolve shortened URLs.

Another problem with the technique of FIG. 2 is cognitive simplicity. Existing URL shortening services approximate the "look and feel" that users may be looking for (e.g., "goo.gl" for Google, "t.co" for Twitter, "gat.es" for Bill Gates). However, domains used by such services are limited by the dictionary of country codes and the inclusion of a "." in the middle. A cognitively easier name (such as the Twitter handles "@google", "@twitter", and "@BillGates") would be almost as short, yet more familiar.

Further potential problems with the technique of FIG. 2 include the following. The TLD may get decommissioned. This has happened in the past with the domains .cs and .zr associated with the former countries of Czechoslovakia and Zaire. The TLD operator may discontinue support for the SLD, for business or political reasons. The URL shortening service may go out of business.

Replacing blocks 204, 206 and 208 with the technique of FIG. 3 may overcome these and other disadvantages of the prior art.

FIG. 3 is a flow chart of a portion of a method for using a shortened URL according to some embodiments. More particularly, according to some embodiments, the blocks of FIG. 3 may replace blocks 204, 206 and 208 of FIG. 2.

At block 302, the browser contacts a navigation service, e.g., 106 of FIG. 1. At block 304, the navigation service applies a rule to the shortened URL (e.g., http://vrsn.cc/1j1XaIR) to obtain the corresponding full URL. In some embodiments, the rule may specify a syntactic transformation. In some embodiments, the rule may specify a lookup operation, e.g., in the navigation service's directory. Further discussion of rule application is included herein. At block 306, the navigation service provides a full URL to the browser, for example, http://blogs.verisigninc.com/blog/entry/verisign_s_preliminary_comments_on, and may cause the browser to access this URL via redirection.

For the improved technique of FIG. 3, the navigation service may be independent of the locations of the resources it supports. In other words, even if a location such as the domain name within a shortened URL becomes unresolvable, the navigation service may continue to operate and users of the technique of FIG. 3 can continue uninterrupted. Further, the navigation service can have multiple providers. An application can be configured to interact with different navigation service providers, each capable of resolving the same set of shortened URLs. If one provider is no longer available for some reason, the application can switch to another provider.

In addition to location independence, the navigation service offers further improvements over the conventional DNS- and HTTP-based mapping in at least two other dimensions. First, rather than a separate transaction with the Domain Name System and with a web server for each lookup, the browser may establish and reuse an ongoing connection with the navigation service. Second, security services such as confidentiality, integrity, and authentication can be built in to the protocol exchange, whereas they are not generally available for the DNS portions of the conventional mapping (other than DNSSEC for data integrity), and may sometimes not be implemented in the HTTP portions.

According to some embodiments, a navigation service may be provisioned with data such that it essentially replicates the functionality of a URL shortening service, but with improved reliability and stability. In that context, "provisioning" means providing the navigation service with data sufficient to match a shortened URL with a corresponding full URL. The navigation service may be provisioned with data from a URL shortening service upon the URL shortening service creating shortened URLs. For this technique, the URL shortening service, after creating a shortened URL, may pass it to the provisioning operation of the navigation service to add the shortened URL to a directory of the navigation service. After creating a shortened URL (denoted here for ease of discussion, "<sURL>") corresponding to a full URL (denoted here for ease of discussion <fURL>), the URL shortening service may add a triple (<sURL>, " ", <fURL>) to the navigation service's directory, where " " is the empty keyword. The URL shortening service may also add other information to the service for other keywords. Alternatively, considering the identifier as a name+keyword combination, if the domain name portion <sDN> of the shortened URL is to be the name portion of the identifier, and the path portion <sPath> is to be the keyword portion, then the service may add (<sDN>, <sPath>, <fURL>) to the directory.

A navigation service may replace the functionality of a URL shortening service by providing a lookup operation upon demand. That is, an application may obtain the full URL corresponding to a shortened URL via the navigation service's lookup operation. The lookup operation, given a shortened URL <sURL>, may find a matching entry (<sURL>, " ", <fURL>) in the directory and return a full URL, denoted <fURL>. Alternatively, given a domain name portion <sDN> and a path portion <sPath>, the lookup operation may find a matching entry (<sDN>, <sPath>, <fURL>) and return <fURL>. If no matching entry exists, the lookup operation may return an error message, for example. The lookup operation may also provide usage information to the URL shortening service.

Note that for a navigation service replicating the functionality of a URL shortening service, the conventional use of the shortened URL can continue, and the directories within the URL shortening service and the navigation service may effectively operate as copies of one other. Over time, however, the navigation service may become a back-end service for the URL shortening service, such that the web server at the shortened URL looks up the full URL via the navigation service.

If multiple navigation service providers are supported, the URL shortening service may provision each of them when it creates a new shortened URL. In addition, a URL shortening service may provision a navigation service with a batch of (<sURL>, " ", <fURL>) or (<sDN>, <sPath>, <fURL>) entries. This may also be done to populate a new navigation service provider with the history of an established shortened URL service.

Thus, by maintaining its own copy of the directory, the navigation service may effectively provide the functionality of an archive for a URL shortening service. The ability of such a navigation service to resolve shortened URLs persists even if a shortened URL is not resolvable via the URL shortening service.

Provisioning the navigation service upon the creation of a shortened URL by a URL shortening service may rely on active participation of the URL shortening service. It may also be possible to provision the navigation service's directory opportunistically, with only passive participation of the URL shortening service, via caching. For example, the navigation service's lookup operation may initially contact the URL shortening service itself to resolve any shortened URLs it does not have in its directory using the conventional DNS- and HTTP-based process, and then store the obtained data to facilitate the answers to later queries.

For mutable shortened URLs, e.g., URLs with textual path names as opposed to random path names that are intended for one-time usage, the mapping may change over time. For such URLs, the URL shortening service may either push the changes to the navigation service, or the navigation service may pull the changes from the URL shortening service during the lookup operation.

Figure 4:
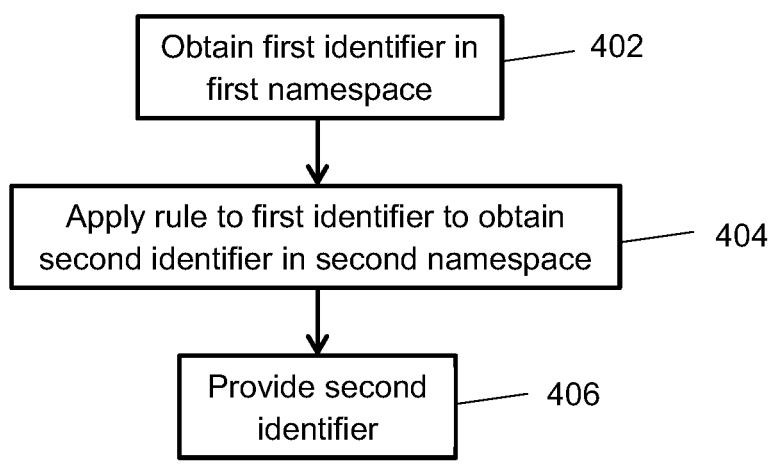
FIG. 4 is a flow chart of a method for obtaining a second identifier from a first identifier according to some embodiments.

FIG. 4 is a flow chart of a method for obtaining a second identifier from a first identifier according to some embodiments. According to some embodiments, the first identifier may be a shortened URL, and the second identifier may be the corresponding full URL. The method of FIG. 4 may be implemented by a system such as that shown and described above in reference to FIG. 1.

At block 402, the navigation service obtains a first identifier in a first name space. The navigation service may obtain such an identifier from a browser executing on a client computer, for example. The browser may be configured with a URL or IP address corresponding to the navigation service. The name space may be any name space, for example, the name space of shortened URLs.

At block 404, the navigation service applies a rule to the first identifier to obtain a second identifier in a second name space. In general, the rule may specify a syntactic transformation that, applied to an input identifier, generates a corresponding output identifier. Alternately, or in addition, the rule may specify a lookup operation, e.g., in a directory of the navigations service.

A particular type of rule is available to entities that have multiple names in multiple name spaces. Such multiple names may refer to essentially the same resource. Nevertheless, a navigation service may include multiple directory portions, one corresponding to each name, and each portion associating a respective name with keyword and URL combinations. Moreover, in such a situation, the entity may select names that are cognitively easy for users to handle.

For example, a more mnemonic alternative to "vrsn.cc" might be "@verisign", the company's Twitter handle. In general, it is possible to construct identifiers such as "@verisign!contact" or "@verisign!news" as a mnemonic shorthand for web pages with contact information or news about the company. Such an entity may therefore employ identifiers such as "@verisign!_1j1XaIR" for arbitrary content that the company wants to associate with its brand, but that does not require a mnemonic keyword, or for which a sufficiently descriptive keyword may be longer than desired—in other words, as a kind of shortened identifier. In this example, the initial "_" character is included as a way of distinguishing shortened URL codes from ordinary keywords. Other syntactic indicators are possible. In practice, user recognition of the "@verisign" string or comparable text for other brands or entities may develop a familiarity, perhaps more easily than "vrsn.cc", thus making identifiers such as "@verisign!_1j1XaIR" more readily recognized as being associated with the company.

Given that "vrsn.cc" already exists as a custom domain for a URL shortening service, the name "@verisign", may serve as an alias for "vrsn.cc" within the navigation service. More precisely, an associated rule may specify the following steps for an identifier associated with the name "@verisign": If the keyword starts with a "_" character, then the remainder of the keyword is treated as a shortened URL code, which is looked up in the directory maintained by the navigation service for "vrsn.cc". Otherwise, if the keyword does not start with a "_" character, then the full keyword is looked up in the navigation service directory for "@verisign".

The above example expands the set of identifiers associated with the name "@verisign" to include shortened URLs with "vrsn.cc", based on the relationship between "vrsn.cc" and "@verisign". According to some embodiments, this may specify a rule for use by the navigation service: the name owner for "@verisign" may indicate to the navigation service that "vrsn.cc" is a related name, and that keywords starting with "_" (or following some other syntax) are to be resolved via the directory entries for "vrsn.cc". The name owner of "@verisign" may provide some proof that the name owner of "vrsn.cc" has authorized the linking.

The above scenario is particularly applicable when "vrsn.cc" has its own set of directory entries in the navigation service directory. However, it is also possible to do the aliasing without "vrsn.cc" having a set of directory entries or the capability to resolve them via the navigation service. Namely, the directory entries corresponding to the shortened URLs under "vrsn.cc" may be provisioned directly as directory entries for "@verisign". For example, when creating a new shortened URL for "vrsn.cc", the URL shortening service may also provision a corresponding entry for "@verisign" with a keyword starting with "_".

For URL shortening services that support textual path names or keywords, the aliasing may encompass them as well, so that, for example, "@verisign!news" may have the same meaning as "vrsn.cc/news" for purposes of a navigation service providing a corresponding URL. When an identifier with such a keyword is provisioned in the navigation service, the corresponding version may be added to the URL shortening service. Similarly, when a shortened URL with such a path name is provisioned in the URL shortening service, the corresponding identifier may be added to the navigation service. If the identifier is mutable, updates in one service may also propagate to the other.

Two advantages of identifiers of the form "@<name>!<keyword>" over shortened URLs, as previously noted, are that they are cognitively easier, and that they introduce a layer of abstraction that potentially masks instability related to the underlying domain name servers or URL shortening service. When the two forms of identifiers are linked together, but each has a separate directory or directory portion, their associated directory entries may be synchronized. Alternately, a potentially simpler approach may be employed, as described presently.

In the aliasing example just described, an identifier such as "@<name>!<keyword>" may be considered as a synonym for the shortened URL "http://<sDN>/<keyword>" where <sDN> is a (presumably short) domain name. The relationship is an instance of a "domain name+path" mapping rule. Namely, given a name and a keyword, the name may be mapped to a domain name portion of a URL, and the keyword may be mapped to the path portion according to a rule represented as: Domain name+path: @<name>!<keyword>→http://<DN>/<keyword>. In the rule representation, <DN> is a domain name (not necessarily associated with a URL shortening service). Other rules are also possible, such as: Domain name+fragment: @<name>!<keyword>→http://<DN>#<keyword>.

Yet other rules may take the form of Subdomain+domain name: @<name>!<keyword>→http://<keyword>.<DN>. Because of restrictions on "dotless" domains, <DN> may be a second-level domain name or lower in the domain name+path or domain name+fragment rules. However, in the subdomain+domain name rule, <DN> may be a top-level domain, i.e., a single label. This may provide a convenient way to represent domain names. For instance, "@verisign!news" may mean the same as "news.verisign", but may follow a name-then-keyword ordering that would make it easier for a browser or application to suggest names and keywords to users.

Another possible rule may state that the navigation service itself maintains a directory associated with the identifier, so that there is no syntactic mapping to another URL, just the lookup in the navigation service directory (which may map to another URL or to content more generally). In such an instance, the rule may specify a lookup and take the form: @<name>!<keyword>→lookup (<name>, <keyword>).

As another possibility, each name may be associated with a different lookup operation, such that a name-specific lookup operation performs the mapping of keyword (and name) to URL. Such a rule may take the form of Name-directed lookup: @<name>!<keyword>→name-specific-lookup (<name>, <keyword>). In such a rule representation, the name-specific lookup operation may be specified by the name owner. The navigation service lookup approach may support this rule indirectly, such that the navigation service lookup operation calls out to the name-specific lookup operation. An advantage of the name-directed lookup approach is that that the application can cache information about which name-specific lookup operation to use based on the name, then resolve the identifier directly via that lookup operation, rather than involving the navigation service each time.

According to some embodiments, a name-specific lookup operation may implement a name-specific search, e.g., to a search engine specified by the name owner. Thus, if the name-specific lookup operation does not have a directory entry for "@<name>!<keyword>", for example, the name-specific search engine may be invoked to look up the keyword. This may have the advantage over conventional search that the search results may be determined by the name owner, rather than by a general-purpose search engine, thus providing a form of brand-directed search as a backup to brand-directed navigation.

As a further possibility, each keyword may be associated with a different keyword-specific lookup operation. In such a situation, the rule may be of the form Keyword-directed lookup: @<name>!<keyword>→keyword-specific-lookup (<name>, <keyword>). For such rule representations, the keyword-specific lookup operation may be determined based on the keyword. Here, the lookup operation (and, for some embodiments, a fallback search operation) is keyword-directed rather than brand-directed. Both variants are possible within the rule-based framework.

To illustrate by way of example, the various rules may map the identifier "@verisign!news" to "vrsn.cc/news", "verisigninc.com/news", "verisigninc.com!news", "news.verisign", to some other URL based on syntax transformation, or to some other URL (or to content more generally) based on directory lookup, which may be general-purpose, via a name-specific lookup operation associated with "@verisign", via a keyword-specific lookup operation associated with "!news", or some other lookup operation. Given that a solo identifier like "@verisign" is widely understood as user identifier in a social media context, and particularly as a Twitter handle, the rule for resolving just "@<name>" without a keyword may be to map it to something like "http://twitter.com/<name>". The "@<name>!<keyword>" syntax may still separately be mapped according to one of the other rules.

The navigation service's lookup operation may apply the rules as part of processing an identifier. Based on the name or identifier, the lookup operation may determine which rule to apply, and then return an appropriately formatted URL. If the target URL is a shortened URL (e.g., the domain name <DN> is known to be associated with a shortened URL service), the lookup operation may also access the shortened URL to get the corresponding full URL, and return that to the application. More generally, the rule may depend on the keyword portion as well as the delimiter, if any, between the name portion and the keyword portion. For example, textual keywords might be mapped in one way (e.g., to subdomains), and shortened URL codes in another (e.g., to a URL shortening service). To avoid ambiguity, a special character may be included that indicates that a keyword is a shortened URL code, e.g., an underscore ("_") or other character that may not appear at the start of a textual keyword. It is also possible that a given name owner may work with multiple URL shortening services, in which case the shortened URL codes for different services may be disambiguated prefixing the shortened URL code with a character or characters that identify the service.

Note that, in general, the navigation service may store any rules in its directory, e.g., in a dedicated column. Additional columns may be assigned to names, keywords, and URLs, for example.

Figure 5:
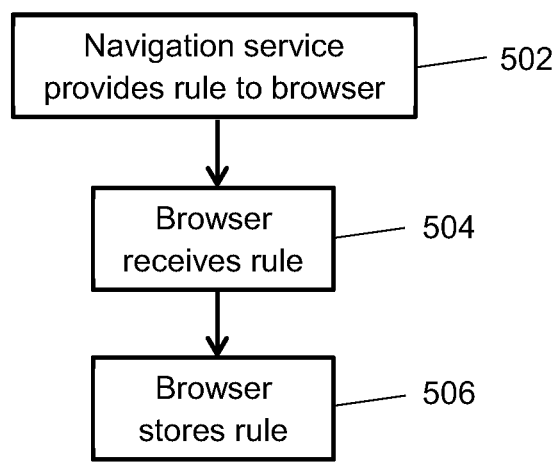
FIG. 5 is a flow chart of a method for providing a rule to a browser according to some embodiments.

FIG. 5 is a flow chart of a method for providing a rule to a browser according to some embodiments. Several of the example rules presented herein do not require that the navigation service maintain a directory in order to obtain an identifier that is associated with another identifier. For example, the mapping may be syntactic (e.g., a manipulation of symbols) only. In these cases, it may be sufficient for the navigation service to provide the rule to an application, such as a browser, executing on a client computer, and the application may apply the rule to the identifier. The application may present the name or identifier to a new rule lookup operation that may return the associated rule. This rule may indicate how the identifier is to be transformed syntactically to a URL or other identifier. The application may then map the identifier to a URL according to the rule. In such instances, the browser (or application generally) need not contact the navigation service to obtain a URL in real time. A description of a process by which a navigation service provides a syntactic or other rule to a browser or other application follows.

At block 502, the navigation service provides a rule to a browser or other application. The rule may be provided in any of a variety of formats. According to some embodiments, the rule may be in extensible markup language (XML). According to some embodiments, a different syntax may be utilized. Identifier mapping based on such rules can be introduced into a browser with a simple browser modification.

In some embodiments, multiple rules may be distributed in bulk as a file. Over the long term, directories may be established for mapping identifiers to URLs with more generality than just a syntax transformation. Those directories may also serve as archives for shortened URLs.

Whether individual rules, or rules distributed in bulk, the navigation service may digitally sign the rule(s) prior to sending. Various digital signature schemes may be employed, e.g., RSA, elliptic curve DSA, Merkle hash signatures, etc. In general, the navigation service may sign a file by computing a cryptographic hash of the file, then processing (e.g., encrypting) the resulting hash with a private key of an asymmetric encryption key scheme to compute a digital signature. The digital signature is then sent together with the file. The rules and/or the digital signatures may specify a validity period or expiration time to allow for the information to be refreshed from time to time.

At block 504, the browser receives the rule. In some embodiments, the browser may pull the rule from the navigation service, e.g., as the browser encounters an identifier whose rule is not known or whose rule has expired. In some embodiments, the navigation service may push the rule to the browser.

For embodiments in which the navigation service digitally signs the rule(s), the browser may verify the digital signature at this stage. In general, this may include processing, using the navigation service's public key of the asymmetric encryption scheme, the received digital signature, and a hash of the file, to determine whether they are a valid combination. (For example, a determination may include determining whether a hash of the file matches (e.g., is identical to) a decryption of the digital signature.) If so, the process may proceed. Otherwise, the browser may conclude the process without storing the rule(s) in the file. In some embodiments, the browser may produce an error message.

At block 506, the browser stores the rule. The browser may store the rule in a local directory, e.g., of the same form as the navigation service directory.

An alternative to the distribution process of FIG. 5 is to distribute the rules via an information-centric network, such as the one described in the Named Data Networking (NDN) project. In such an embodiment, the authentication may be explicit. In NDN, a client computer may broadcast its interest in obtaining information associated with a given name. A network node that has the requested information, i.e., in its cache, may respond directly to the client computer. A node that does not have the requested information may relay the request to other nodes, and may respond to the client after the other nodes reply. The information may be authenticated with a chain of digital signatures leading back to a signature verification key held by the client computer.

For embodiments that utilize an information-centric network, the rules for mapping name+keyword combinations to URLs may be published via the network. There are many ways to name rules on such a network. One possibility is "/smartnav/<name>/_mapping". Here, "smartnav" indicates that the name is associated with a smart navigation service as described herein, "<name>" is the name portion of the identifier (e.g., "verisign"), and "_mapping" indicates that the mapping rule associated with the name is of interest. The navigation service may manage the name space under "/smartnav"; the name owner of "<name>" may manage the name space under "/smartnav/<name>" via interfaces provided by the navigation service, such as the provisioning operation, described below in reference to FIG. 6.

To continue the example, the application may interact with the network as follows to resolve "@verisign!1j1XaIR":

(1) The application expresses interest in "/smartnav/verisign/_mapping".

(2) The network responds with the mapping rule, e.g., the domain name+path rule, @verisignkkeyword>→http://vrsn.cc/<keyword>, together with a digital signature on the rule (or file containing one or multiple rules).

(3) The application verifies the digital signature then applies the rule to produce the URL http://vrsn.cc/1j1XaIR.

(4) The application accesses the page at the URL.

This approach has at least two advantages, both of which address the previously discussed shortcomings with shortened URLs. First, network nodes in an information-centric network are intended to be widely available and broadly applicable. The ability for a client computer to resolve an identifier may not be limited by the availability of a specific TLD or SLD name server, or URL shortening service. Rather, it may be correlated with the objectives of the network overall. Thus, if the TLD or SLD name server or URL shortening service were to be unavailable for some reason, the information-centric network, which may still be expected to operate, may be updated to respond with a different mapping rule, e.g., the navigation service lookup rule. The application, after verifying the digital signature, may then apply the new rule to resolve the content to the URL. The user may see the same identifier, and may be directed to the same content; just the mappings in the middle would change.

Second, identifiers in an information-centric network may be names in a general and extensible name space, not limited by the specific constraints of DNS names. Thus, the cognitively easier names such as "@verisign" may be widely deployed, independent of whether these exist in DNS.

According to some embodiments, an entire identifier of the form "@verisign!_1j1XaiR" (or any other identifier in general) may be resolved via the information-centric network; it may be mapped to a name such as "/smartnav/verisign/_1j1XaIR", and the network may return the associated content (perhaps the full URL, if the identifier corresponds to a shortened URL). However, such resolution may include that the associated information for each identifier be provisioned into the information-centric network. By populating instead just the list of rules, it is possible to get started without as much overhead.

Figure 6:
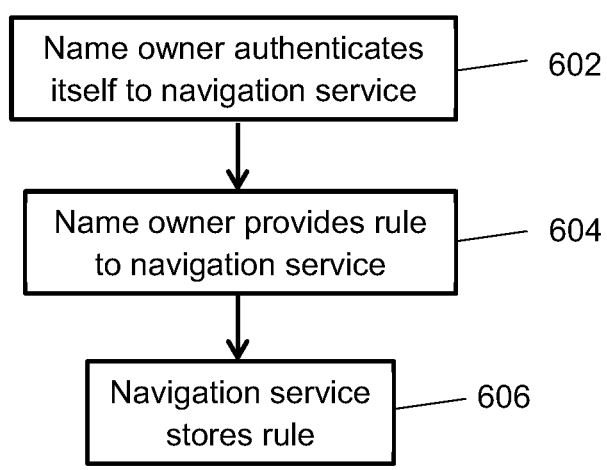
FIG. 6 is a flow chart of a method for provisioning a rule to a navigation service according to some embodiments.

FIG. 6 is a flow chart of a method for provisioning, by a name owner, a rule to a navigation service according to some embodiments. A name owner may use the process of FIG. 6 to supply the navigation service with a rule or association between identifiers/keywords.

At block 602, the name owner authenticates itself to the navigation service. This may be accomplished using the same communication as that of block 604, or in separate communications. In some implementations, the name owner demonstrates that it is indeed associated with the entity name in question. This may be accomplished when first establishing authentication credentials, e.g., when the name owner signs up for an account with the navigation service. For example, if the name space consists of email addresses, a confirmation message may be sent to the specified email address. Proof of successful receipt of that confirmation message (e.g., by return email or by receiving particular data at a URL in the email message) may demonstrate ownership of the email address. As another example, if the name space is from one of the social networks (e.g., FACEBOOK), it may be possible for the name owner to log in to the navigation service using credentials from that social network, which may demonstrate ownership of the corresponding name. Mechanisms for demonstrating ownership of domain names are known in the art of domain name management and may be used for provisioning operations as discussed herein.

Provisioning in the TWITTER name space may be accomplished using existing TWITTER authentication techniques. That is, TWITTER itself authenticates TWITTER users when they post messages or "tweets" to its service, so tweets automatically carry proof of ownership of the associated name. Thus, a direct tweet to the provisioning operation of the navigation service may be accepted as an authentic request to update information in the navigation service's entity representations. For example, a tweet or Twitter "direct message" from "@example_brand" to a service with a designated handle such as "@provisioning_operation" of the form "update #news <URL>" may be used to update the network locator associated with "@example_brand#news" to "<URL>". Continuing this example, and for some embodiments, no web interface or email is required, rather, just a tweet directly to the provisioning operation. The "tweet" channel to the provisioning operation may also support a broader command set, including setting new entity names, keywords and network locators.

Provisioning in social networks such as FACEBOOK and LINKEDIN may be accomplished by "sharing" content with certain keywords, via special-purpose applications within the respective environments.

At block 604, the name owner provides a rule to the navigation service. The rule may be formatted and packaged as described herein. The rule may be combined with an authentication communication as described above in reference to block 602.

At block 606, the navigation service stores the rule, e.g., in its directory as described elsewhere herein.

Various optional features of the embodiments described herein are contemplated.

As one example, the navigation service itself may provide URL shortening directly. Supplied with a name and a URL, the navigation service may employ a shortening operation to generate a new keyword and add the (<name>, <keyword>, <URL>) triple to its directory, where the keyword may be selected as a pseudorandom value, similar to the selection of the code via a conventional URL shortening service. This may be done with a call to an underlying URL shortening service, or it may be done within the navigation service itself without a corresponding URL shortening service. By adding a shortening operation, it may be possible for name owner to create and manage both textual keywords and shortened identifiers directly via a navigation service.

As another example of an optional feature, keyword services may be supported. In such an embodiment, the name owner (or the navigation service by default) delegates the resolution of identifiers involving specific keywords to a designated keyword service provider. Keyword parameters or "commands" capabilities can similarly be supported.

As yet another example of an optional feature, applications other than browsers may recognize identifiers, e.g., name+keyword combinations, as set forth herein. For example, email clients, social media applications and office tools may be programmed to recognize syntax corresponding to a navigation-service-recognizable string. In such applications, as a user types, e.g., "@<name>!<keyword>", the application may generate a corresponding hyperlink. The hyperlink may be set directly to the URL corresponding to the identifier if the rule set is available for immediate application, a flag may be set such that the rules may be applied when the link is clicked, or the link may point to the navigation service to handle the mapping.

As yet another example of an optional feature, reverse mapping is possible. If a user types a conventional URL that a browser or application confirms, based on the rules, corresponds to an identifier in the new syntax, then the browser or application may display the identifier in the new syntax, while maintaining the conventional URL as a hyperlink behind it.

As yet another example of an optional feature, the approaches described herein may also be employed for mapping to identifiers other than URLs. For instance, an identifier such as "@<name>!<keyword>" may be mapped to a domain name (e.g., "<keyword>.<name>" without the "http://", for use in a different service), to an email address (e.g., "<keyword>@<name>.com"), or to an identifier for information-centric networking.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method for resolving an identifier over the internet without using a domain name system (DNS) by obtaining, from electronically stored data representing a first identifier in a first name space, electronically stored data representing a second identifier in a second name space, the method comprising:
    obtaining, at a first electronic navigation service comprising an electronic server computer, from an executing browser configured with an internet protocol address of the first electronic navigation service, and over the internet without using the DNS, electronically stored data representing the first identifier in the first name space;
    obtaining, from an electronic directory communicatively coupled to the first navigation service, electronically stored data representing a rule mapping the first identifier in the first name space to the second identifier in the second name space;
    applying the rule to the first identifier in the first name space, whereby the second identifier in the second name space is obtained; and
    providing electronically stored data representing the second identifier to the executing browser over the internet, wherein the second identifier is resolvable to a network locator by a second navigation service;
    whereby the second identifier is obtained without resolving the first identifier using the DNS.

2. The method of claim 1, wherein the first name space is a name space of uniform resource locators (URL), wherein the first identifier is a URL, wherein the second name space is a name space of uniform resource locators (URL), and wherein the second identifier is a URL.

3. The method of claim 1, wherein the rule specifies a lookup operation.

4. The method of claim 1, wherein the first identifier comprises a name, and wherein the method further comprises obtaining a representation of the rule from an owner of the name.

5. The method of claim 4, wherein the representation of the rule comprises a cryptographic digital signature of the name owner.

6. The method of claim 4, wherein the first name space is a name space of uniform resource locators (URL) and wherein the first identifier is a URL, the method further comprising responding to the name owner with the second identifier comprising a URL comprising no more than 21 characters.

7. The method of claim 1, wherein the rule comprises a description of a syntactic manipulation of an identifier.

8. A computer system for resolving an identifier over the internet without using a domain name system (DNS) by obtaining, from electronically stored data representing a first identifier in a first name space, electronically stored data representing a second identifier in a second name space, the system comprising at least one electronic processor in operative communication with at least one electronic memory storing computer-readable instructions which, when executed by the at least one electronic processor, cause the at least one electronic processor to:
    obtain, at a first electronic navigation service comprising an electronic server computer, from an executing browser configured with an internet protocol address of the first electronic navigation service, and over the internet without using the DNS, electronically stored data representing the first identifier in the first name space;
    obtain, from an electronic directory communicatively coupled to the first navigation service, electronically stored data representing a rule mapping the first identifier in the first name space to the second identifier in the second name space;
    apply the rule to the first identifier in the first name space, whereby the second identifier in the second name space is obtained, wherein the second identifier is resolvable to a network locator by a second navigation service; and provide electronically stored data representing the second identifier to the executing browser over the internet;

whereby the second identifier is obtained without resolving the first identifier using the DNS.

9. The system of claim 8, wherein the first name space is a name space of uniform resource locators (URL), wherein the first identifier is a URL, wherein the second name space is a name space of uniform resource locators (URL), and wherein the second identifier is a URL.

10. The system of claim 8, wherein the rule specifies a lookup operation.

11. The system of claim 8, wherein the first identifier comprises a name, and wherein the at least one electronic memory further stores computer-readable instructions which, when executed by the at least one electronic processor, further cause the at least one electronic processor to:

obtain a representation of the rule from an owner of the name.

12. The system of claim 11, wherein the representation of the rule comprises a cryptographic digital signature of the name owner.

13. The system of claim 11, wherein the first name space is a name space of uniform resource locators (URL) and wherein the first identifier is a URL, wherein the at least one electronic memory further stores computer-readable instructions which, when executed by the at least one electronic processor, further cause the at least one electronic processor to:

respond to the name owner with the second identifier comprising a URL comprising no more than 21 characters.

14. The system of claim 8, wherein the rule comprises a description of a syntactic manipulation of an identifier.

* * * * *